3,071,585
PROCESS FOR PREPARING 2,6-DIMETHYLMOR-PHOLINYLMERCAPTOBENZOTHIAZOLE
Charles E. Grabiel, Midland, and Henry Volk, Bay City, Mich., assignors to The Dow Chemical Company, Midland, Mich., a corporation of Delaware
No Drawing. Original application Dec. 30, 1957, Ser. No. 705,769. Divided and this application Nov. 27, 1959, Ser. No. 855,544
1 Claim. (Cl. 260—247.1)

This invention relates to a new compound, 2-[4-(2,6-dimethylmorpholinyl)mercapto] - benzothiazole, hereinafter referred to as DMMBT, and to process for its production.

Mercaptobenzothiazole, hereinafter referred to as MBT, has been oxidatively condensed with amines to form sulfenamides. However, when these previously known processes are applied to the condensation of 2,6-dimethylmorpholine (hereinafter referred to as DMM) with MBT, the desired product has been obtained only in low yield and low purity, the major undesired by-product being benzothiazyl disulfide.

It has now been discovered that DMMBT can be made in high yield and purity by the condensation of DMM with MBT, provided the reaction is conducted according to the process described hereinafter. It has further been discovered that DMMBT is a particularly effective delayed-action vulcanization accelerator for use in the curing of natural and synthetic rubbers. Also, it is an effective fungicide and bactericide.

In making DMMBT, four reactants are used: MBT, DMM, caustic alkali and chlorine. While the prior art suggests many variations in procedure for bringing together MBT, amine, caustic and chlorine, it has been found that none of them is satisfactory when the amine is DMM.

It has now been discovered that DMMBT can be readily made in high yield and purity by the simultaneous addition, in substantially equimolecular proportions, of (a) chlorine and (b) an aqueous alkaline solution of MBT containing about 1 to 3 moles of alkali metal hydroxide per mole of MBT to an aqueous solution containing about 1 to 3 moles of alkali metal carbonate and about 1.2 to 3 moles of DMM per mole of MBT to be used, the temperature of the resulting reaction mixture being maintained at about 0 to 30° C. during the addition. The reaction is quite rapid and is complete within a few minutes after the mixing of the reactants is complete. The product separates as a solid which may be isolated by filtration, washed with water and dried to yield DMMBT in high yield and purity.

The alkali metal hydroxide and carbonate used in the process of the invention may be those of any alkali metal, particularly those of sodium or potassium, though in the interest of economy those of sodium are preferred.

Since the reaction is strongly exothermic, it is necessary to provide means for cooling the reaction mixture and to mix the reactants gradually, with effective agitation. Because of this need for gradual mixing of reactants and for adequate cooling and in view of the almost instantaneous nature of the reaction, the process is especially adapted for continuous operation. In such operation, the three reactant streams, (a) chlorine, (b) alkaline MBT, and (c) alkaline DMM, are simultaneously metered into a reactor from which is drawn a slurry of the desired product. Substantially complete reaction occurs in the brief time of a few seconds to, at most, a very few minutes.

The following examples illustrate the invention.

*Example 1*

PREPARATION OF DMMBT

Three gram-moles of sodium carbonate and 1.3 moles of 2,6-dimethylmorpholine (31% aqueous solution) were dissolved in 800 cc. of water in a vessel equipped with a stirrer and submerged gas-inlet tube. While the solution was vigorously stirred, chlorine was bubbled in at the rate of 175 cc. per minute while adding at an equivalent rate a solution of 1.0 mole of MBT and 3.0 moles of sodium hydroxide in 400 cc. of water. During this mixing operation the temperature of the mixture was kept at 20–25° C. by external cooling. The pH of the solution, as measured by a glass electrode, remained at 11–12 during the mixing. When all the MBT had been added, the chlorine was stopped and stirring was continued for 5 minutes. The DMMBT was filtered from the resulting slurry, washed with water and dried at 50° C. in a vacuum oven to produce a yield of 88% of theory of high grade DMMBT. It was a light tan-colored powder containing less than 2% of the corresponding disulfide.

*Example 2*

USE OF DMMBT AS A VULCANIZATION ACCELERATOR

DMMBT is an effective delayed-action accelerator for the vulcanization of rubber and, as such, avoids scorching (premature vulcanization) during hot mixing, milling or molding of the rubber, yet facilitates easy vulcanization at slightly higher temperatures. For such use, it is incorporated into the rubber at the rate of about 0.1 to 2% by weight, preferably about 0.5 to 1.0%. Thus, when 0.5% by weight was milled into a Hevea-HAF compounded tread stock rubber it was found to delay scorching at 250° F., yet permitted ready vulcanization at 280° F. The following scorch data were obtained by use of the well known Mooney viscometer at 250° F.

MOONEY SCORCH TEST

|  | Minutes |
|---|---|
| Initial | 27 |
| 10 point rise | 38 |

The same composition was vulcanized at 280° F. for 60 minutes, after which it was found that excellent vulcanization had occurred.

*Example 3*

USE OF DMMBT AS A FUNGICIDE

When an aqueous spray containing 3 lb. of DMMBT per 100 gallons was sprayed on tomato plants which were then inoculated with the test organism, a 55% control of *Alternaria solani* was obtained. The active material may also be mixed with a dust carrier and applied as a dust with good results.

*Example 4*

USE OF DMMBT AS A BACTERICIDE

Nutrient media which readily supported the growth of the test organisms were modified by the inclusion of 0.5%, by weight, of DMMBT, after which *Salmonella typhosa*, *Staph. aureus*, *Aspergillus terreus* and *Rhizopus nigricans* all failed to grow when inoculated on the media.

This application is a division of copending application Serial No. 705,769, filed December 30, 1957.

We claim:

A process for making 2-[4-(2,6-dimethylmorpholinyl)mercapto]benzothiazole comprising simultaneously mixing (a) about one mole of chlorine, (b) an aqueous solution of one mole of mercaptobenzothiazole and about 1 to 3 moles of alkali metal hydroxide, and (c) an aqueous solution of about 1 to 3 moles of an alkali metal carbonate and about 1.2 to 3 moles of 2,6-dimethylmorpholine, the temperature of the resulting mixture being maintained at about 0–30° C. during and immediately after said mixing, and separating the thus formed solid product from the aqueous phase of said mixture.

References Cited in the file of this patent

UNITED STATES PATENTS

| | | |
|---|---|---|
| 2,045,888 | Tschunkur et al. | June 30, 1936 |
| 2,271,834 | Carr | Feb. 3, 1942 |
| 2,730,526 | Kinstler | Jan. 10, 1956 |
| 2,758,995 | Sullivan | Aug. 14, 1956 |